US007672467B2

(12) United States Patent
Okabayashi

(10) Patent No.: US 7,672,467 B2
(45) Date of Patent: Mar. 2, 2010

(54) DIGITAL MIXER CAPABLE OF MONITORING SURROUND SIGNALS

(75) Inventor: Masaaki Okabayashi, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 573 days.

(21) Appl. No.: 10/278,399

(22) Filed: Oct. 23, 2002

(65) Prior Publication Data

US 2003/0076966 A1 Apr. 24, 2003

(30) Foreign Application Priority Data

Oct. 24, 2001 (JP) ............................ 2001-325970

(51) Int. Cl.
*H04B 1/00* (2006.01)
*G06F 17/00* (2006.01)
*H04B 1/20* (2006.01)

(52) U.S. Cl. .............................. 381/119; 700/94; 369/4

(58) Field of Classification Search ................. 381/119, 381/307, 58, 56; 700/94; 364/4; 369/4
See application file for complete search history.

(56) References Cited

U.S. PATENT DOCUMENTS 5,471,539 A 11/1995 Flum et al.
6,681,018 B1 * 1/2004 Asakura et al. ............... 381/18

FOREIGN PATENT DOCUMENTS

| | | |
|---|---|---|
| JP | 07-029354 | 1/1995 |
| JP | 07-042219 | 7/1995 |
| JP | 08-130427 | 5/1996 |
| JP | 09-259539 | 10/1997 |
| JP | 2000-032599 * | 1/2000 |

OTHER PUBLICATIONS

Yamaha, 02R Digital Recording Console, Version 2, Owner's Manual.

Yamaha Digital Production Console DM2000 Owner's Manual, Feb. 2002 (7 pages).

Notice of Grounds for Rejection mailed May 26, 2009, for JP Application No. 2007-035793, with English translation, six pages.

(Continued)

*Primary Examiner*—Vivian Chin
*Assistant Examiner*—Douglas J Suthers
(74) *Attorney, Agent, or Firm*—Morrison & Foerster LLP

(57) ABSTRACT

In a digital mixer capable of forming a plurality of externally-input signals into multi-channel surround signals by a mixing bus section, a plurality of output channels are set which correspond to a multi-channel surround channel configuration and are connected to a monitoring speaker system. When the externally-input signals are multi-channel surround signals, the digital mixer permits a selection as to whether the externally-input signals are to be monitored. If the signals are to be monitored, they are patched or converted in such a manner that their surround channel configuration agrees with the surround channel configuration of monitoring output channels, and then the externally-input signals are distributed among the monitoring output channels. Further, the digital mixer permits another selection as to whether the multi-channel surround signals formed by the mixing bus section are to be monitored. If the signals are to be monitored, they are distributed among the monitoring output channels.

10 Claims, 7 Drawing Sheets

OTHER PUBLICATIONS

Yamaha (2000). AW4416 Professional Audio Workstation Operation Guide, English language, 279 pages.

Yamaha (2000). AW4416 Professional Audio Workstation Operation Guide, Japanese language, 271 pages.

Yamaha (2001). Digital Mixing Console 01V, Owner's Manual, pp. 24, 25, 75-79, 205 and 206 (English language translation of pp. 26, 27, 79-84, 216 and 217).

Yamaha (2001). Digital Mixing Console 01V, Owner's Manual, pp. 26, 27, 79-84, 216 and 217 (Japanese language).

* cited by examiner

SURROUND NONITOR SETTING SCREEN 1

SURROUND NONITOR SETTING SCREEN 2

ALLOCATION, TO SURROUND CHANNEL, OF MIX BUS

| SURROUND MODE | BUS1 | BUS2 | BUS3 | BUS4 | BUS5 | BUS6 | BUS7 | BUS8 |
|---|---|---|---|---|---|---|---|---|
| STEREO | | | | | | | | |
| 2+2 | L | R | Ls | Rs | | | | |
| 3+1 | L | R | C | S | | | | |
| 5. 1 | L | R | Ls | Rs | C | LFE | | |
| 6. 1 | L | R | Ls | Rs | C | LFE | Cs | |
| 7. 1 | L | R | Ls | Rs | C | LFE | Lc | Rc |

DIGITAL MIXER CAPABLE OF MONITORING SURROUND SIGNALS

BACKGROUND OF THE INVENTION

The present invention relates to a novel digital mixer which is capable of monitoring multi-channel surround signals.

Audio mixing consoles have been known which are operable to adjust levels and frequency characteristics of audio signals input from many microphones or electric or electronic musical instruments, mix the thus-adjusted audio signals into several mixed audio signal groups, and deliver the mixed audio signals groups to power amplifiers. Generally, a human operator of the mixing console adjusts respective tone volumes and colors of audio signals representative of musical instrument tones and/or singing voices to conditions that appear to most appropriately express a performance, by manipulating various panel operators provided on the mixing console. The mixing console includes, as a signal input section of the console, a plurality of input channels for inputting signals from a plurality of microphones and other external equipment (microphone/line input signals), and the signal input section is programmed to perform a mixing process on the input signals in a desired manner and pass resultant mixing-processed signals to a plurality of output channels constituting a signal output section of the console. Generally, the signals of the individual input channels are amplified by head amplifiers and then delivered to a mixing processing section that adjusts respective frequency characteristics and levels of the signals and then mixes the signals in programmed combinations. After that, each of the thus-mixed signals is set to a desired output level via an output fader and then passed to any one of the output channels.

Typically, such mixing consoles are employed in theaters and concert halls and also used in recording studios to produce music sources for recording onto compact disks (CDs), DVDs, etc. For example, in the case of the mixing console used in a recording studio, tones performed by musical instruments and singing voices are input as initial mixing materials to be processed by the console. The mixing console adjusts the levels and frequency characteristics of a multiplicity of audio signals externally input via the microphones and mixes the thus-adjusted signals in desired combinations. Then, the mixing console adjusts the levels of the mixed signals and outputs the thus level-adjusted mixed signals. There have been known digital mixers that use DSPs and the like to digitally perform the mixing processing in such mixing consoles.

Generally, in theaters and the like, a plurality of speakers are placed at front and rear positions (i.e., in front of and in back of audience seats) in order to produce a sound field affording a high sense of presence or realism to the audience. Systems for producing such a high sense of presence or realism are commonly called "surround systems". Most of the known digital mixers too are constructed to produce, as music sources to be recorded (i.e., recording music sources), mixing-processed signals that can attain a surround effect using any desired one of various surround modes, several of which are illustratively shown in FIGS. 10A to 10F.

The surround mode shown in FIG. 10A is a "stereo" mode, where left and right front speakers L, R are placed to achieve a sense of realism. The surround mode shown in FIG. 10B is a "(2+2)-channel" mode, where left and right front speakers L, R and left and right rear speakers Ls, Rs are placed to achieve a sense of realism. Further, the surround mode shown in FIG. 10C is a "(3+1)-channel" mode, where left, center and right front speakers L, C, R, and one center rear speaker S are placed to achieve a sense of realism.

Furthermore, FIG. 10D shows a "5.1-channel" mode, where left, center and right front speakers L, C, R, and left and right rear speakers Ls, Rs are placed, with a woofer speaker LFE placed at a suitable position, to achieve a sense of realism. FIG. 10E shows a "6.1-channel" mode, where left, center and right front speakers L, C, R, and left, center and rear speakers Ls, Cs, Rs are placed, with a woofer speaker LFE placed at a suitable position, to achieve a sense of realism. Furthermore, FIG. 10F shows a "7.1-channel" mode, where left, center and right front speakers L, C, R, left-center and right-center front speakers Lc, Rc, and left and right rear speakers Ls, Rs are placed, with a woofer speaker LFE placed at a suitable position, to achieve a sense of realism. In the following description, the surround modes of FIGS. 10B to 10F, other than the surround mode of FIG. 10A, are also referred to as multi-channel surround modes.

To localize a sound image at a predetermined position in a particular surround mode selected from among the above-mentioned various surround modes, it has been conventional to supply the installed speakers with surround signals having been adjusted to levels corresponding to the selected surround mode and predetermined localizing position. Although the conventional digital mixers are equipped with the above-mentioned surround modes, they can not produce output for monitoring surround signals in any of the surround modes having a greater number of channels than the stereo mode. Thus, the conventional digital mixers have been unable to monitor the surround signals to be used as the initial mixing materials and the surround signals to be used as the recording music sources.

SUMMARY OF THE INVENTION

In view of the foregoing, it is an object of the present invention to provide a novel digital mixer which can monitor multi-channel surround signals.

The present invention provides a digital mixer which selectively delivers a plurality of externally-input signals to a mixing bus section to perform mixing on the input signals by the mixing bus section and selectively passes the input signals, having been subjected to the mixing by the mixing bus section, to a plurality of outputs, and which is capable of forming the plurality of externally-input signals into multi-channel surround signals by the mixing bus section. The digital mixer of the present invention comprises: an output section corresponding to a plurality of monitoring output channels, the plurality of monitoring output channels corresponding to a multi-channel surround channel configuration; and a selection section that, when the plurality of externally-input signals are multi-channel surround signals, can select a monitoring option of supplying the output section with the externally-input multi-channel surround signals and thereby permitting direct monitoring of the externally-input multi-channel surround signals. In the digital mixer of the present invention, the selection section can also select another monitoring option of supplying the output section with the multi-channel surround signals formed by the mixing bus section and thereby permitting monitoring of the formed multi-channel surround signals.

In the digital mixer of the present invention including a plurality of monitoring output channels corresponding to a multi-channel surround channel configuration, if a plurality of externally-input signals (initial mixing materials) are multi-channel surround signals, the externally-input multi-channel surround signals can be directly monitored by being distributed among the monitoring output channels. Further, the multi-channel surround signals formed by the mixing bus section (mixing-processed multi-channel surround signals) can also be monitored by being distributed among the monitoring output channels. Thus, a human operator of the digital mixer is allowed to freely monitor a multi-channel surround state of the externally-input signals that are initial mixing materials to be processed by the digital mixer, or a multi-channel surround state of the mixing-processed multi-channel surround signals (that are to be output for recording purposes).

In one embodiment of the present invention, when the multi-channel surround channel configuration of the plurality of externally-input signals does not agree with the multi-channel surround channel configuration of the monitoring output channels, the selection section may convert the multi-channel surround channel configuration of the plurality of externally-input signals so as to correspond to the multi-channel surround channel configuration of the monitoring output channels.

According to another aspect of the present invention, there is provided a method for monitoring surround signals in a mixer which selectively delivers a plurality of externally-input signals to a mixing bus section to perform mixing on the input signals by the mixing bus section and selectively passes the input signals, having been subjected to the mixing by the mixing bus section, to a plurality of outputs, the digital mixer being capable of forming the plurality of externally-input signals into multi-channel surround signals by the mixing bus section, the digital mixer including a plurality of monitoring output channels corresponding to a multi-channel surround channel configuration. The method of the present invention comprises: making a selection as to whether or not the plurality of externally-input signals are to be monitored, when the plurality of externally-input signals are multi-channel surround signals; and distributing the plurality of externally-input signals among the plurality of monitoring output channels in such a manner that a surround channel configuration of the plurality of externally-input signals corresponds to a surround channel configuration of the monitoring output channels, when monitoring of the plurality of externally-input signals has been selected.

The method of the present invention may further comprise making another selection as to whether or not the multi-channel surround signals formed by the mixing bus section are to be monitored; and distributing the multi-channel surround signals, formed by the mixing bus section, among the plurality of monitoring output channels, when monitoring of the formed multi-channel surround signals has been selected.

The present invention may be constructed and implemented not only as the apparatus invention as discussed above but also as a method invention. Also, the present invention may be arranged and implemented as a software program for execution by a processor such as a computer or DSP, as well as a storage medium storing such a program. Further, the processor used in the present invention may comprise a dedicated processor with dedicated logic built in hardware, not to mention a computer or DSP capable of running a desired software program.

While the embodiments to be described herein represent the preferred form of the present invention, it is to be understood that various modifications will occur to those skilled in the art without departing from the spirit of the invention. The scope of the present invention is therefore to be determined solely by the appended claims.

BRIEF DESCRIPTION OF THE DRAWINGS

For better understanding of the object and other features of the present invention, its preferred embodiments will be described hereinbelow in greater detail with reference to the accompanying drawings, in which.

DETAILED DESCRIPTION OF THE INVENTION

Figure 1:
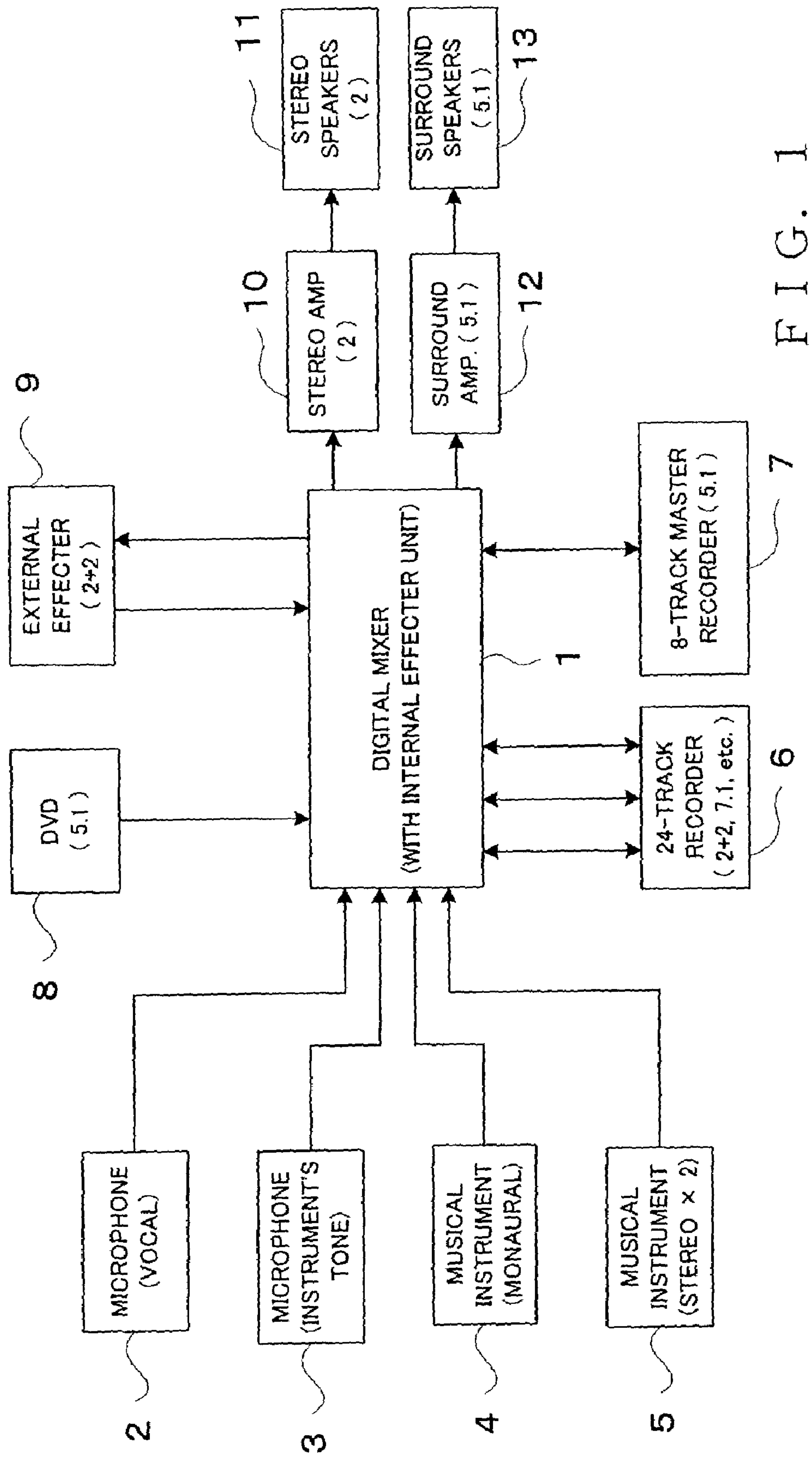
FIG. 1 is a block diagram showing a digital mixer in accordance with an embodiment of the present invention, and various peripherals connected to the digital mixer.

FIG. 1 is a block diagram showing a digital mixer in accordance with an embodiment of the present invention, and various peripherals connected to the digital mixer.

To the digital mixer 1 are connected a microphone 2 for picking up vocals (i.e., vocal microphone) and a microphone 3 for picking up tones played by one or more musical instruments (i.e., instrument tone microphone); the vocals (singing voices). Voices and tones picked up by the vocal microphone and instrument tone microphone 2 and 3 are input to the digital mixer 1. Two or more vocal microphones 2 and two or more instrument tone microphones 3 may be connected to the digital mixer 1. Also connected to the digital mixer 1 are a monaural musical instrument (i.e., musical instrument for producing monaural output) 4 and two-channel stereo musical instrument (i.e., musical instrument for producing stereo output) 5; tone signals generated by the musical instruments 4 and 5 are also input to the digital mixer 1. Two or more monaural musical instruments 4 and two or more stereo musical instruments 5 may be connected to the digital mixer 1. Among other signals input to the digital mixer 1 are digital signals of vocal sounds and tones output from a DVD (Digital Versatile Disk) drive 8, and signals of vocal sounds, tones, effect sounds and the like output as initial mixing materials from a 24-track recorder unit 6. The digital mixer 1 converts analog signals, included in the thus-input signals of vocal sounds, tones and the like, into digital representation, and then it adjusts frequency characteristics, levels and the like of the converted digital signals to thereby deliver the thus-adjusted signals to a bus unit such as a mixing bus unit. At the same time, the digital mixer 1 delivers digital signals, included in the input signals, to the bus unit after adjusting frequency characteristics, levels and the like of the digital signals. The signals mixing-processed by the bus unit are further adjusted in their frequency characteristics and output level and then ultimately output to outside the digital mixer 1 as recording signals or the like.

Importantly, the digital mixer 1 of the present invention is constructed to be able to produce stereo monitoring output and multi-channel surround monitoring output. The stereo monitoring output is amplified by a stereo amplifier 10 and audibly reproduced or sounded via two monitoring stereo speakers 11. Where surround monitoring output produced from the digital mixer 1 for monitoring multi-channel (e.g., 5.1-channel) surround signals is to be coupled to speakers, the monitoring output is amplified via a surround amplifier unit 12 having at least six channels and then audibly reproduced via a 5.1-channel monitoring surround speaker unit 13 consisting of six speakers. The digital mixer 1 can produce surround monitoring output of eight channels, and thus, if the surround amplifier unit 12 has eight channels, surround speakers 13 of up to 7.1 channels can be connected to the digital mixer 1 via the amplifier unit 12. Let it be assumed here that the monitoring stereo speakers 11 and monitoring surround speaker unit 13 are installed in a control room of a recording studio. The 24-track recorder unit 6, connected to the digital mixer 1, includes three groups of recorders, each group having eight channels, and the groups of recorders each permits reproduction of surround signals of a selected multi-channel surround mode, such as the (2+2)-channel, 5.1-channel or 7.1-channel mode. The resultant reproduced signals of the 24-track recorder unit 6 are supplied to the digital mixer 1 as signals to be used as initial mixing materials for subsequent music source recording. Further, the 8-track master recorder unit 7, connected to the digital mixer 1, has eight channels so that it can record multi-channel surround signals, i.e. music sources to be recorded, of the (2+2)-channel, 5.1-channel or 7.1-channel surround mode having been mixed by the digital mixer 1.

Figure 10A:
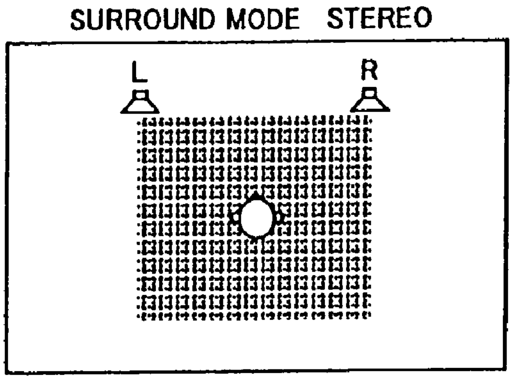
FIGS. 10A to 10F are diagrams showing examples of arrangement of speakers in various surround modes.
Figure 10B:
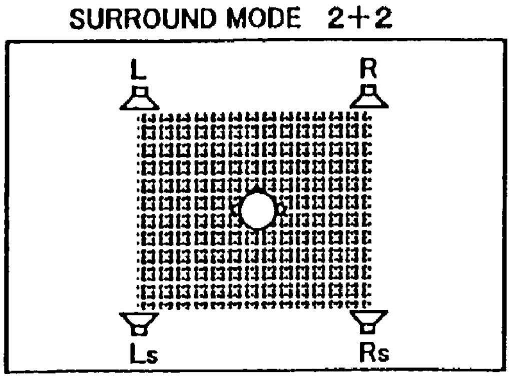
Figure 10C:
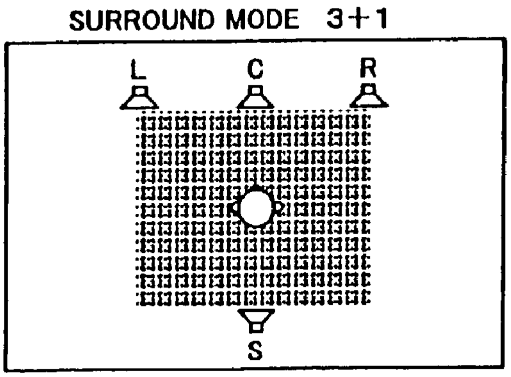
Figure 10D:
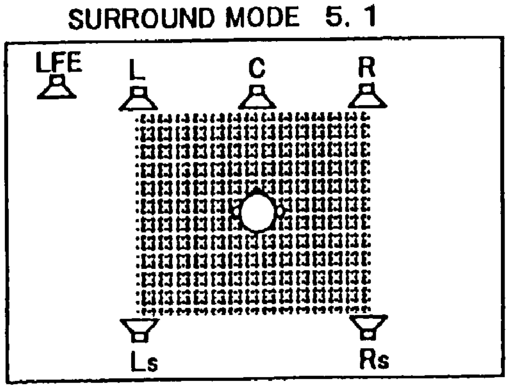
Figure 10E:
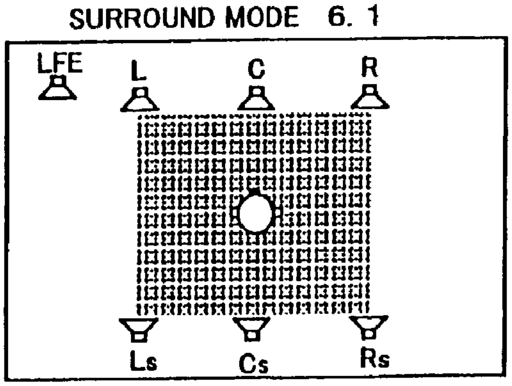
Figure 10F:
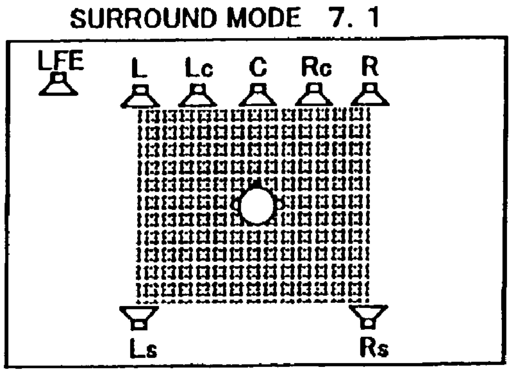
FIG. 10F (PRIOR ART)

If the monitoring surround speaker unit 13 is designed for the 5.1-channel surround mode, the speakers 13 are placed in the control room in the layout as illustrated in FIG. 10D. Thus, the monitoring surround speaker unit 13 permits monitoring of the multi-channel surround signals reproduced, as the initial mixing materials, by the individual recorder groups of the 24-track recorder unit 6 as well as the mixed recording multi-channel surround signals. Further, the monitoring surround speaker unit 13 also permits monitoring of the multi-channel surround signals recorded in the 8-track master recorder unit 7 as the signals are reproduced from the recorder unit 7. In this way, the user or human operator can monitor multi-channel surround signals that produce a sound field full of realism.

Figure 2:
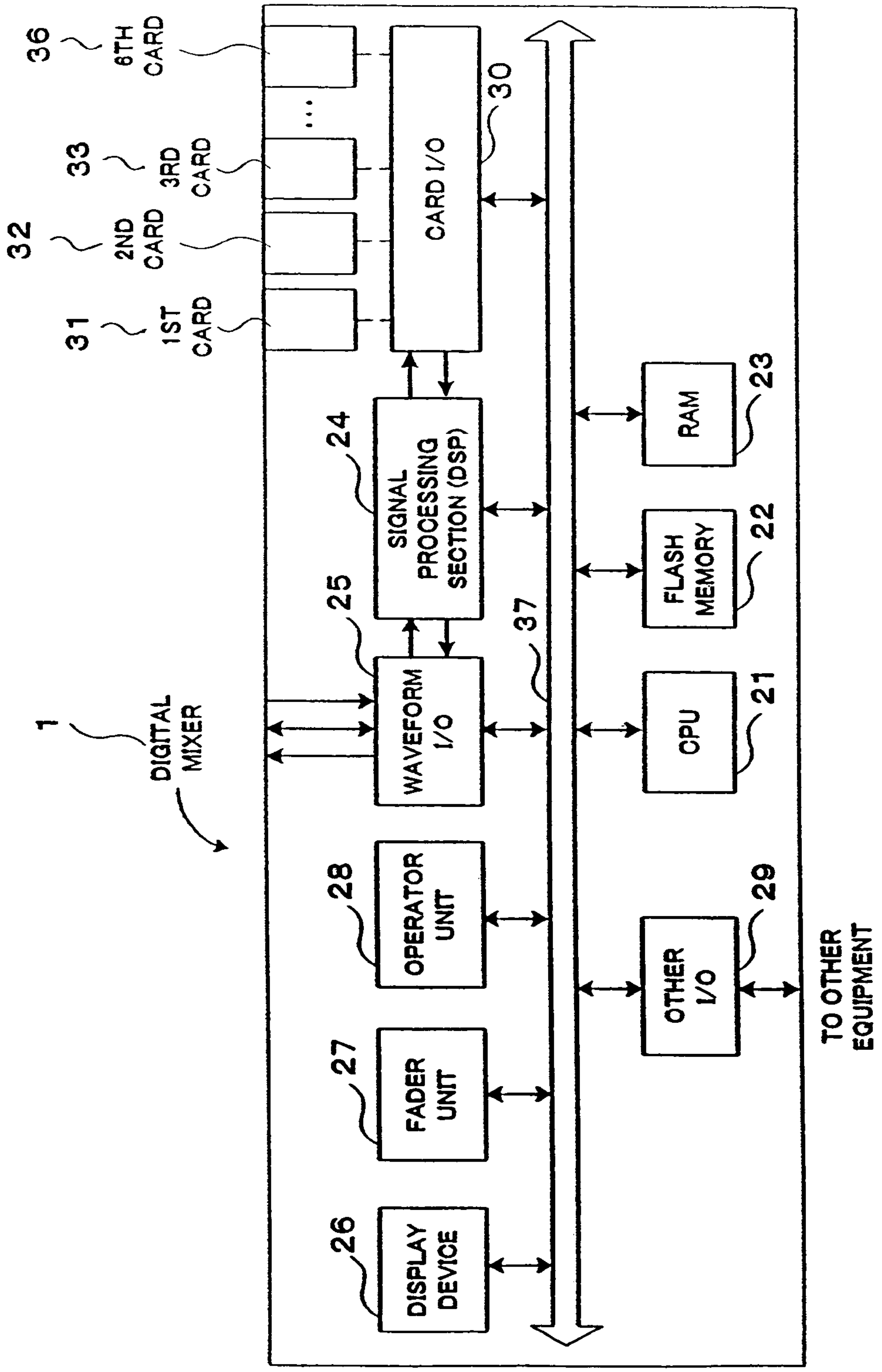
FIG. 2 is a block diagram showing a general setup of the digital mixer of FIG. 1.

FIG. 2 is a block diagram showing a general setup of the digital mixer 1 of the present invention.

The digital mixer 1 includes: a CPU (Central Processing Unit) 21 for controlling general behavior of the digital mixer 1 and generating control signals in response to operation of mixing and surround operators; a rewritable, nonvolatile flash memory 22 having stored therein various processing software, such as mixing control programs for execution by the CPU 21; and a RAM (Random Access Memory) 23 functioning as a working area for the CPU 21 and memory area for storing various data. With the flash memory 22 having stored therein the processing software, it is possible to upgrade the version of the processing software by rewriting the stored processing software. Signal processing section 24, which is composed of a multiplicity of DSPs, performs mixing processing and surround monitoring processing under the control of the CPU 21.

The digital mixer 1 further includes a waveform data interface (waveform I/O) 25 via which all waveform input and output to and from the digital mixer 1 are effected. Analog audio signals to be input to the waveform data interface 25 include stereo analog signals and talk-back signals that represent human operator's voices to communicate with staff on a stage, which are converted into digital representation via the waveform data interface 25. Analog audio signals to be output from the waveform data interface 25 include stereo monitoring output and surround monitoring output. When a cue switch (not shown) is turned on, a cue signal is generated to cue sound generation of a given channel, and the waveform data interface 25 outputs the cue signal after converting the cue signal into analog representation.

Further, in the digital mixer 1, a display device 26, which is, for example, in the form of a liquid crystal display (LCD), is capable of displaying, in a bar graph, levels of digital signals at various mixing stages. The display device 26 is also capable of displaying a surround-mode setting screen when surround monitoring settings are to be made. Electric fader unit 27 is operable to adjust, either manually or electrically, output levels of signals to be delivered to the mixing (MIX) bus unit, send levels to the auxiliary (AUX) bus unit and output levels of signals having been output from these bus units. Panel operator unit 28 includes a multiplicity of operators for the human operator to control equalizing characteristics, panning characteristics etc. of various signals. In making surround settings, a two-dimensional localizing position can be controlled as desired using a rotary encoder or joystick provided on the operator unit 28.

Other interface (I/O) 29 is an interface via which signals are communicated between the digital mixer 1 and the DVD drive 8 and external effecter 9. The signal processing section 24 can communicate signals with any one of first to six cards 31 to 36 via a card interface (card I/O) 30. The first to six cards 31 to 36, each having eight channels, are attached to respective card slots. The eight channels of each of the cards 31 to 36 will hereinafter be referred to as a "slot". The cards 31 to 36 usable in the instant embodiment include an analog-in/digital-out card containing an A/D converter, digital-in/digital-out card, and digital-in/analog-out card containing a D/A converter. Bus 37 is a common data path through which data are exchanged between various components of the digital mixer 1. Here, the digital-in/digital-out card is capable of concurrently inputting and outputting data to and from the digital mixer 1.

Figure 3:
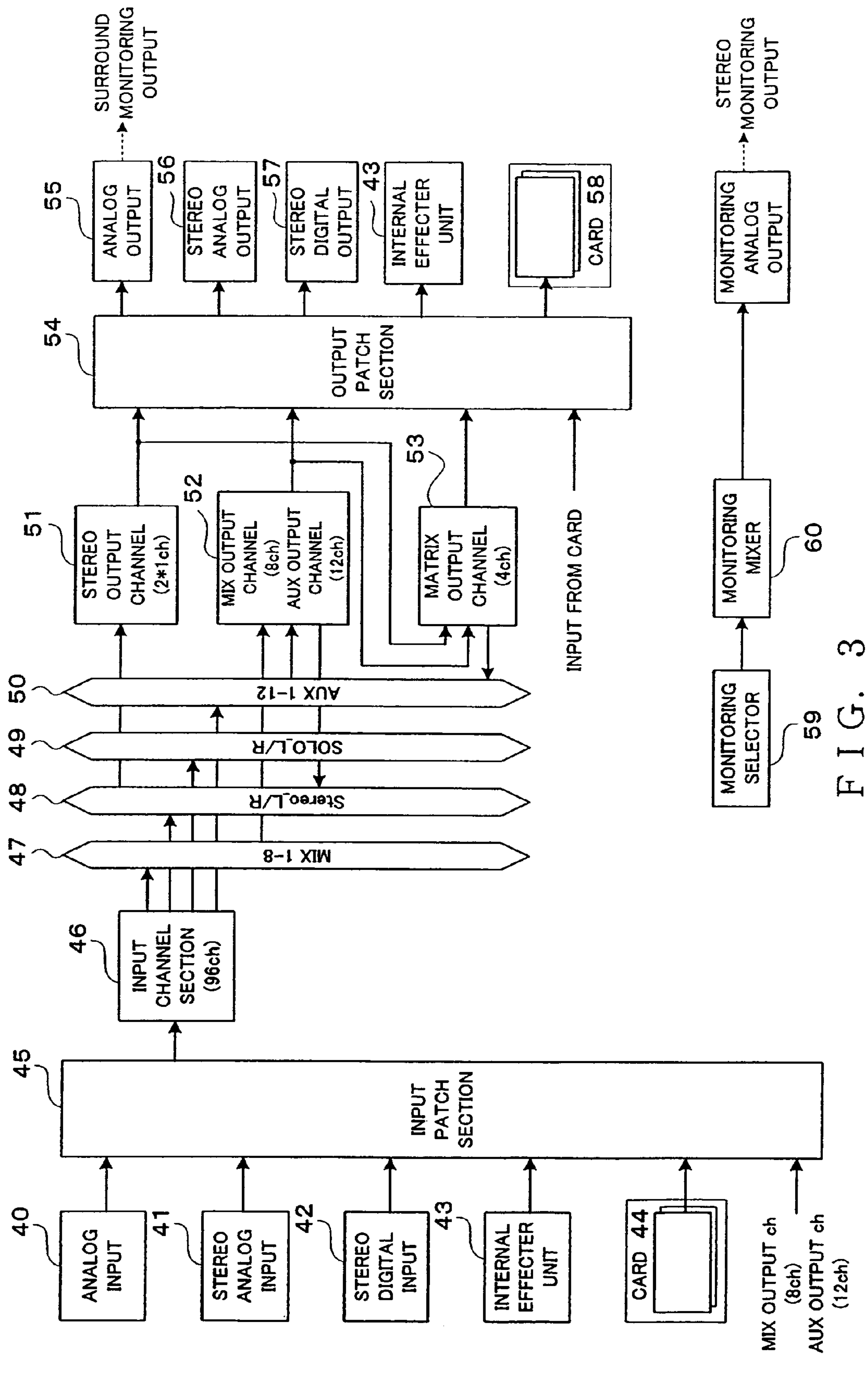
FIG. 3 is an equivalent functional block diagram showing various functions of the digital mixer of FIG. 2 for performing mixing processing.

FIG. 3 is an equivalent functional block diagram showing various functions of the digital mixer 1 of FIG. 2 for performing the mixing processing and surround processing.

In FIG. 3, an analog audio signal input to an analog input unit 40 having 24 channels is converted via an internal A/D converter of the input unit 40 into a digital audio signal and then passed to an input patch section 45. Stereo analog audio signals input to a stereo analog input unit 41 having two stereo channels are converted via an internal A/D converter of the unit 41 into digital audio signals and then passed to the input patch section 45. Digital audio signals input to a stereo digital input unit 42 having three stereo channels are also input to the input patch section 45. The above-mentioned input units 40, 41 and 42 are included in the waveform I/O 25. Digital signals output from any one of the cards 44 are also passed to the input patch section 45. As noted above, the digital mixer 1 has six card slots so that up to six cards 44 can be attached to the mixer 1.

For example, the cards 44 may each be an analog-in/digital-out, card-shaped input unit equipped with an A/D conversion function. In such a case, when multi-channel surround signals, i.e. initial mixing materials, reproduced by the 24-track recorder unit 6 are input to the card 44, the multi-channel surround signals are converted via the internal A/D converter of the card 44 into digital surround signals, so that the converted digital surround signals are passed to the input patch section 45. Where the 24-track recorder unit 6, supplying multi-channel surround signals (initial mixing materials) to the card 44, is a digital recorder, a digital-in/analog-out, card-shaped input unit is used as the card 44. Digital signals output from the card 44 can also be supplied to an output patch section 54, so that the user or human operator can monitor a surround state of input signals as will be later described in detail. The digital mixer 1 also includes an internal effecter unit 43 composed of eight effecters, and each signal imparted with an effect via the internal effecter unit 43 is also passed to the input patch section 45. Further, signals of eight mixing output channels and twelve AUX output channels, output from an output channel section 52, can also be passed to the input patch section 45.

The input patch section 45 can patch (couple) a plurality of input signals to respective input channels of an input channel section 46 having, for example, 96 channels. Each of the input channels of the input channel section 46 is provided with a noise gate, compressor, delay element, fader and send level adjuster for adjusting a level of each signal to be output to the MIX and AUX bus units 47 and 50. Frequency characteristics of the signal, output level to the MIX bus 47 and send level to the AUX bus 50 are controlled in each of the input channels. Digital signals of 96 channels output from the input channel section 46 are each selectively supplied to one or more of eight mixing (MIX) buses 47, as well as to a stereo bus unit (Stereo_L/R) unit 48 having left (L) and right (R) buses, solo bus unit (SOLO_L/R) unit 49 having left (L) and right (R) buses and one or more of twelve AUX buses 50.

The MIX bus unit 47 mixes, by its eight MIX buses, the selectively-input digital signals of the 96 channels in accordance with a predetermined mixing program, and then it supplies mixing-processed (MIX output) signals of a total of eight channels to the output channel (MIX output and AUX output channel) section 52. In this way, it is possible for the digital mixer 1 to provide a maximum of eight different mixing-processed (MIX output) signals of eight channels, i.e. signals mixed in eight different manners. The output signals from the MIX bus unit 47 become ultimate surround output signals. The AUX bus unit 50 mixes, by its twelve AUX buses, the selectively-input digital signals of the 96 channels in accordance with a predetermined mixing program, and then it supplies AUX output signals of twelve channels to the output channel section 52. In this way, it is possible for the digital mixer 1 to provide a maximum of twelve different mixing-processed (AUX output) signals of twelve channels, i.e. signals mixed in twelve different manners. The output signals from the AUX bus unit 50 are intermediate surround output signals, which are then delivered, for example, to the internal effecter unit 43. The output channel section 52 is composed of 20 (8+12) output channels each equipped with an equalizer, compressor, delay element, fader, etc.

The stereo bus unit 48 performs mixing on the digital signals of the 96 channels, having been input to its left and right buses, in accordance with a predetermined mixing program, and then it outputs stereo mixing-processed output signals of one channel to a stereo output channel section 51. The solo bus unit 49 outputs, from its left and right buses, digital signals of one channel among those signals of 96 channels having been input to the left and right buses, so that the output signals of the individual input channels can be monitored although not specifically shown.

The stereo mixing-processed signals of one stereo channel output from the stereo output channel section 51 and the MIX and AUX output signals of the 20 (8+12) channels from the output channel section 52 are selectively input to a matrix output channel (MATRIX OUTPUT ch) section 53, which performs mixing on the input signals to produce matrix output signals of four channels. The matrix output channel section 53 is composed of four output channels each provided with an equalizer, compressor, delay element, fader, etc. Different control is performed for each of the output channels in the matrix output channel section 53, so that the matrix output channel section 53 can provide different matrix output signals of four channels. The output signals from the matrix output channel section 53 can be supplied to the stereo bus unit 48 so that stereo signals mixed by the stereo bus unit 48 are delivered to the stereo output channel section 51.

The stereo mixed signals of one channel output from the stereo output channel section 51, the MIX and AUX output signals of the (8+12) channels output from the output channel section 52 and the matrix output signals of four channels from the matrix output channel section 53 are supplied to the output patch section 54. The output patch section 54 patches (couples) each of the supplied digital signals to any of an analog output unit 55 having eight channels, stereo analog output unit 56 having one stereo channel, stereo digital output unit 57 having three stereo channels, internal effecter unit (consisting of eight internal effecters) 43 and cards 58 each having eight channels (one slot). In this case, each of the digital signals supplied to the output patch section 54 can be patched (coupled) to a plurality of destinations, although each of the destinations can receive only one digital signal at a time. The internal effecter unit 43 imparts an effect, such as reverberation, echo or chorus, to the digital audio signals. The internal effecter unit 43 is implemented by the DSPs constituting the above-mentioned signal processing section 24. As stated above, the output signals from the internal effecter unit 43 can be transferred to the input patch section 45. Further, each of the cards 58 can output multi-channel surround signals, and these output multi-channel surround signals from the card 58 can be supplied to the 8-track master recorder unit 7 for recording.

Digital output signals supplied to the analog output unit 55 are each converted into analog representation via an internal D/A converter of the output unit 55. The output patch section 54 can patch multi-channel surround signals, output from the output channel section 52 and matrix output channel section 53, to the analog output unit 55 having eight channels. Here, in the case where the digital mixer 1 is constructed to produce multi-channel surround monitoring output as shown in FIG. 1, such surround monitoring output is supplied via the analog output unit 55. The multi-channel surround monitoring output is amplified by the surround amplifier unit 12 and then audibly reproduced via the monitoring surround speaker unit 13 in a sound image full of realism. By connecting the surround amplifier unit 12 of eight channels to the eight output channels of the analog output unit 55 and connecting eight speakers to the surround amplifier unit 12, the digital mixer 1 can deal with surround mixing of up to 7.1 channels. In the illustrated example of FIG. 1, the surround amplifier unit 12 has eight channels so as to function as a 5.1-channel amplifier. In a case where the monitoring surround speaker unit 13 is arranged so as to implement the 5.1-channel surround mode (see FIG. 10D), CHANNEL 1 of the analog output unit 55 is allocated to the left front speaker channel L, CHANNEL 2 allocated to the right front speaker channel R, CHANNEL 3 allocated to the left rear speaker channel Ls, CHANNEL 4 allocated to the right rear speaker channel Rs, CHANNEL 5 allocated to the center speaker channel C, and CHANNEL 6 allocated to the woofer speaker channel LFE.

Figure 4:
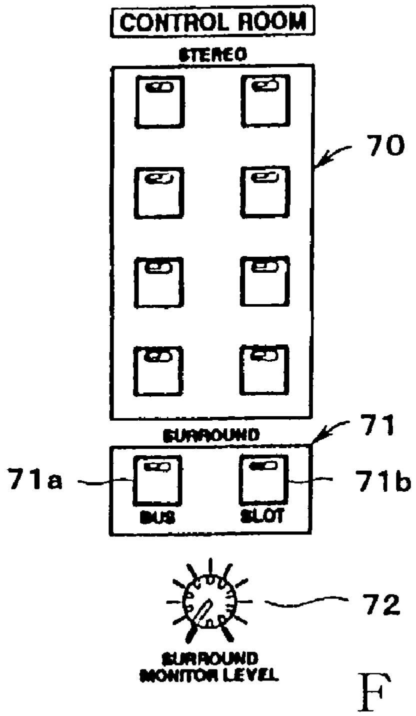
FIG. 4 is a diagram showing arrangement of monitoring switches provided on the digital mixer of FIG. 2.

This and following paragraphs describe the surround monitoring output of the digital mixer 1. A set of monitoring switches are provided on the operation panel of the digital mixer 1, as illustrated in FIG. 4. When the user has activated a slot selecting button 71*b* in a group of surround monitoring switches 71, signals of a plurality of channels, having been supplied from the card 44 to the output patch section 54, are patched, as multi-channel surround monitoring signals, to the 8-channel analog output unit 55. Specifically, in this case, the speaker channels of the 5.1-channel surround mode are assigned to CHANNEL 1-CHANNEL 6 of the analog output unit 55 as noted above, and the surround signals from the card 44 are, as surround monitoring output, amplified by the surround amplifier unit 12 and then sounded via the monitoring surround speakers 13 arranged in the control room in accordance with the 5.1-channel configuration. Thus, in a case where the card 44 is supplied with multi-channel surround signals reproduced by the 24-track recorder unit 6, the multi-channel surround signals can be monitored in the currently-selected surround configuration.

Further, when the user has activated a MIX-bus selecting button 71*a* in the group of surround monitoring switches 71, multi-channel monitoring surround signals, mixed by the MIX but unit 47, are patched, via the output patch section 54, to the analog output unit 55. In this case too, the surround signals mixed by the MIX but unit 47 are sounded, as surround monitoring output, via the monitoring surround speakers 13 arranged in the control room in accordance with the 5.1-channel configuration. Thus, the multi-channel surround signals mixed by the MIX but unit 47 can be monitored in the currently-selected surround configuration.

Note that when the MIX bus unit 47 is set in one of the multi-channel surround modes than the stereo mode, one of the MIX-bus selecting button 71*a* and slot selecting button 71*b* in the surround monitoring switch group 71, which is being currently activated or ON, is lit or illuminated. When, on the other hand, the MIX bus unit 47 is set in the stereo mode, none of the buttons in the surround monitoring switch group 71 is illuminated.

As noted previously, the digital mixer 1 of the present invention is arranged in such a manner that, when multi-channel surround signals are to be monitored, it allows the user to select one or more of the cards 44 (i.e., external input groups) to be monitored by selecting one or more of the slots and it also allows surround channels to be patched to respective channels of each selected card 44 having eight channels or one slot (surround monitoring patch setting); namely, the digital mixer 1 is constructed to allow the surround channel configuration of the externally-input signals to correspond to the monitoring surround channel configuration. Details of the multi-channel surround monitoring scheme of the present invention will be given later.

Each stereo digital signal patched via the output patch section 54 to the stereo analog output unit 56 is output after being converted into a stereo analog output signal by means of an internal D/A converter of the stereo analog output unit 56. This stereo analog output signal can be recorded in the 8-track master recorder unit 7 or the like. Further, each stereo digital signal patched via the output patch section 54 to the stereo digital output unit 57 is supplied to a DAT (Digital Audio Tape) or the like for digital recording. The above-mentioned output units 55, 56 and 57 are included in the waveform I/O section 25.

Further, the card 58 having eight channels or one slot is a digital-in/digital-out or digital-in/analog-out card, and the output patch section 54 can patch multi-channel surround signals, given from the output channel section 52 or matrix output channel section 53, to the card 58. In the case where the card 58 is a digital-in/analog-out card, multi-channel surround signals, patched via the output patch section 54 to the card 58, are output after being converted into analog surround signals via the internal D/A converter of the card 58. The thus-output surround signals can be recorded in the 8-track master recorder unit 7 or the like. If the card 58 is a digital-in/digital-out card, digital surround signals output from the card 58 can be recorded in a digital recorder or the like.

When AUX output signals mixed by the AUX bus 50 have been patched to the card 58, the card 58 can supply the AUX output signals to the external effecter 9. The internal effecter unit 43 and external effecter 9 are each constructed to be able to impart an effect to signals of a plurality of channels. For effect impartment, the internal effecter unit 43 and external effecter 9 may include a one-input/six-output reverberator, two-input/two-output three band limiter, compressor, expander, and four-input/four-output reverberator and compressor. Signals imparted with an effect via the internal effecter 43 are delivered to the input patch section 45.

Note that the digital mixer 1 of the present invention can monitor stereo signals input to the stereo bus 48, mixed stereo signals and stereo signals output from the stereo output channel section 51 in a selective manner or in a combined manner. Which of the above-mentioned stereo output signals should be monitored is selected by any one of monitoring selectors 59 in the form of stereo monitoring switches 70 of FIG. 4. In this case, two or more stereo signals can be selected from the stereo output channel section 51, stereo analog output unit 56, stereo digital output unit 57 and output channel section 52. The thus-selected monitoring stereo signals are mixed by a monitoring mixer 60, amplified via the stereo amplifier 10, and then sounded via the stereo speakers 11 or monitoring headphones.

The following paragraphs describe surround monitor setting processing performed in the digital mixer 1 of the present invention.

Figure 5:
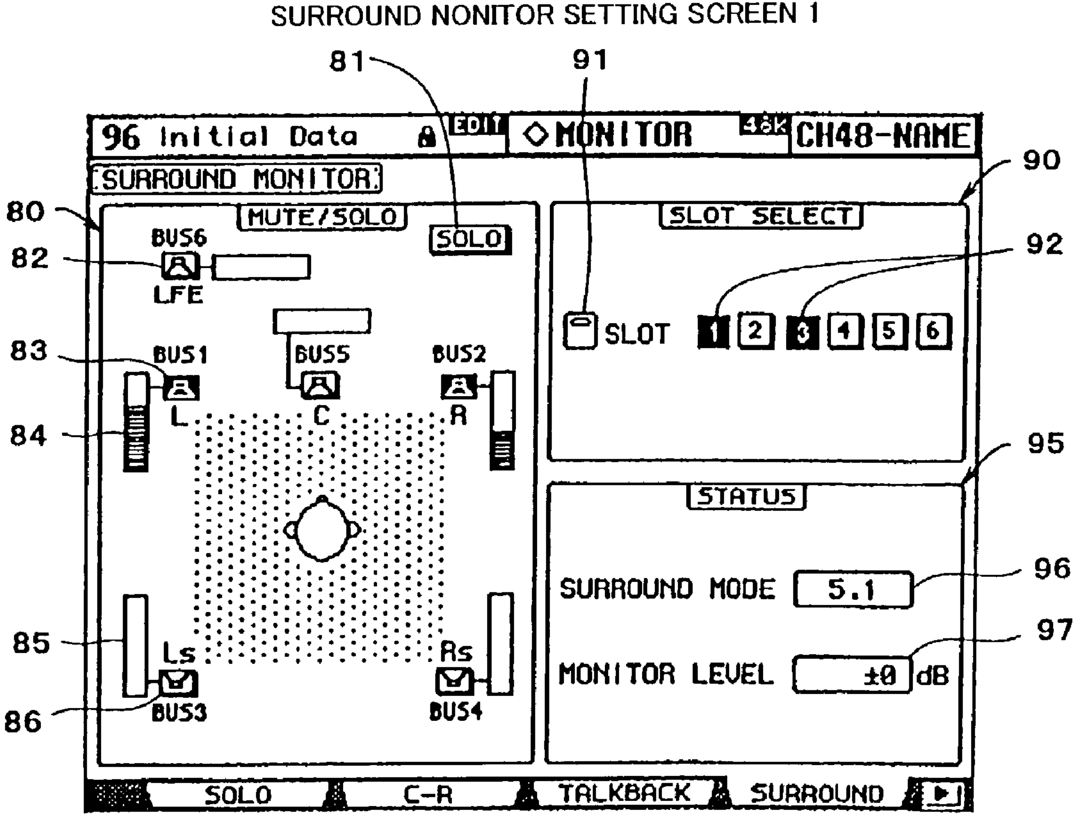
FIG. 5 is a diagram shows Surround Monitor Setting Screen 1 displayed on a display device of the digital mixer in first surround monitor setting processing.

FIG. 5 shows a first surround monitor setting screen (Surround Monitor Setting Screen 1) displayed on the display device 26 of the digital mixer 1 in first surround-monitor setting processing that is directed to setting a slot to be monitored from among the six card-attaching slots of the digital mixer 1. With Surround Monitor Setting Screen 1, it is also possible to set an output channel to be muted from among the output channels corresponding to the buses of the MIX bus unit 47. In a display area 80 of the surround monitor setting screen of FIG. 5, there are displayed pieces of information in a case where the MIX but unit 47 is set in the 5.1-channel surround mode. In this example, the currently-selected surround mode is displayed by speaker icons 82, 83, indicating the arrangement or configuration of the 5.1-channel surround speakers. Near the speaker icons 82, 83, 86 . . . , there are displayed BUS 1-BUS 6 of the MIX but unit 47 that output surround signals to the respective speaker channels. Further, in the illustrated example, only the icons 83 representative of the left and right front speakers L and R in the display area 80 are currently in an ON state (displayed in a while-out fashion), which indicates that the left and right front speakers L and R are not currently muted. Further, in the illustrated example, the icons 82, . . . representative of the other speakers Ls, Rs, C and LFE are in an OFF state, which indicates that the other speakers Ls, Rs, C and LFE are currently muted. Further, in the area 80, level indicators 84, 85, . . . are displayed near the respective speaker icons, which indicate current levels of surround signals supplied to the corresponding non-muted speakers. When a SOLO button 81 is activated, the mute is temporarily canceled so that only the last-selected output is provided.

Further, in another display area 90 of the surround monitor setting screen of FIG. 5, there are displayed a SLOT button 91 and slot numbers 92 to allow the user to select and set one or more slot to be monitored; in the illustrated example, SLOT 1 and SLOT 3 have been selected so as to be monitored. Where SLOT 1 and SLOT 3 have been selected as monitoring slots as in the illustrated example, multi-channel surround signals of SLOT 1 and SLOT 3 are added, on a channel-by-channel basis, to thereby generate surround monitoring output. The surround monitor settings of the selected slots become effective when the slot selecting button 71*b* of FIG. 4 has been activated or when the displayed SLOT button 91 has been activated, and then surround signals of the cards 44 corresponding to SLOT 1 and SLOT 3 are added to generate surround monitoring output. The thus-generated surround monitoring output is delivered to the analog output unit 55 and then monitored in the manner as described above. The monitoring surround signals can be adjusted in level via a volume control 72 shown in FIG. 4.

Further, in still another display area 95 of the surround monitor setting screen of FIG. 5, there are displayed surround-related statuses; namely, a box 96 in the area 95 indicates that the MIX bus unit 47 is currently set in the 5.1-channel surround mode, and a box 97 indicates that the current monitoring level of the surround monitoring output, having been adjusted via the volume control 72, is "0 dB".

Figure 6:
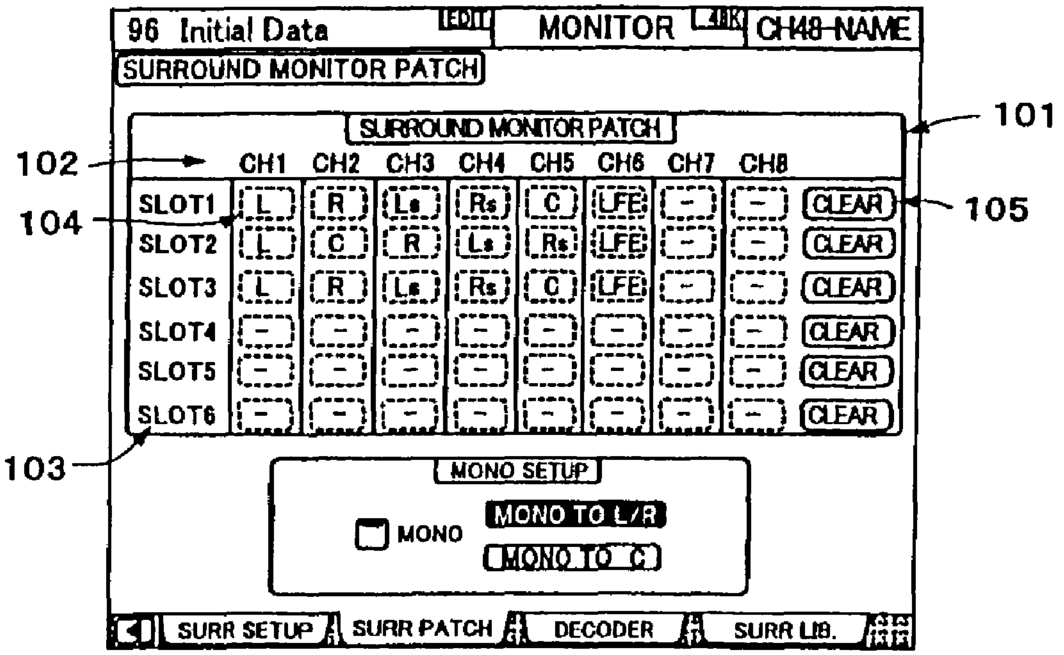
FIG. 6 is a diagram shows Surround Monitor Setting Screen 2 displayed on the display device in second surround monitor setting processing.

FIG. 6 shows a second surround monitor setting screen (Surround Monitor Setting Screen 2) displayed on the display device 26 of the digital mixer 1 in second surround-monitor setting processing that is directed to setting patches from the individual channels of the card 44 to the surround channels (that correspond to the channels of the analog output unit 55).

Display area 101 of Surround Monitor Setting Screen 2 is a surround-monitor-patch setting area. In an upper portion of the surround-monitor-patch setting area 101, there are displayed channel numbers 102 of channels CH1 to CH8 included in SLOT 1 to SLOT 6. Further, in a left end portion of the surround-monitor-patch setting area 101, there are displayed slot numbers 103 of SLOT 1, SLOT 2, . . . , SLOT 6 in the top-to-bottom direction. In this case, each of the slots corresponds to a group of externally-input signals of a plurality of channels. In matrix positions defined by combinations of the channel numbers 102 and slot numbers 103, there are displayed respective patched surround channels 104. Here, each of the surround channels 104 is one of surround channels corresponding to the currently-selected surround mode (in this case, 5.1-channel surround mode). The second surround-monitor setting processing is directed to patching the surround channels 104 to channels CH1 to CH8 of each of SLOT 1 to SLOT 6.

The displayed surround channels 104 correspond to the speakers arranged in the currently-selected surround mode. For example, signals of six channels (L, R, Ls, Rs, C and LFE) are input from SLOT 1 and patched to the six channels of the 5.1-channel surround mode. Namely, the surround channel of the left front speaker L is patched to channel CH1, the surround channel of the right front speaker R patched to channel CH2, the surround channel of the left rear speaker Ls patched to channel CH3, the surround channel of the right rear speaker Rs patched to channel CH4, the surround channel of the center front speaker C patched to channel CH5, the surround channel of the woofer speaker LFE patched to channel CH6, and no surround channel patched to channels CH7 and CH8. With such patch settings, the following coupling is effected by the output patch section 54 when the surround monitor of SLOT 1 is turned on. CHANNEL 1 of the card 44 inserted in SLOT 1 is patched (coupled) to a predetermined surround monitor output (e.g., CHANNEL 1 of the analog output unit 55) to which the output channel of MIX BUS 1 (the surround channel L in the 5.1-channel mode) is normally patched, in place of the output channel of MIX BUS 1. Similarly, CHANNEL 2 of the card 44 inserted in SLOT 1 is patched to CHANNEL 2 of the analog output unit 55 in place of the output channel of MIX BUS 2 (the surround channel R in the 5.1-channel mode). CHANNEL 3 of the card 44 inserted in SLOT 1 is patched to CHANNEL 3 of the analog output unit 55 in place of the output channel of MIX BUS 3 (the surround channel Ls in the 5.1-channel mode). CHANNEL 4 to CHANNEL 6 of the card 44 inserted in SLOT 1 are patched in a similar manner to CHANNEL 1-CHANNEL 3. Further, the surround channels of the 5.1-channel mode are patched to SLOT 2 in a different manner from SLOT 1. The surround channels of the 5.1-channel mode are patched to SLOT 3 in a similar manner to SLOT 1. No surround channel is patched to channels CH1 to CH8 of SLOT 4 to SLOT 6. Note that CLEAR buttons 105 are displayed in a right end portion of the area 101 in corresponding relation to SLOT 1 to SLOT 6 and each of the CLEAR buttons 105 is operable to clear the surround channels 104 patched to the corresponding slot.

In some case, the multi-channel surround signals supplied from the card 44 may be set in another surround mode than the 5.1-channel surround mode. In such a case, the patching, to CHANNEL 1-CHANNEL 8, of the surround channels 104 is modified in the second surround-monitor setting processing. For example, in a case where signals of the (2+2)-channel configuration (channels L, R, Ls, Rs) are input from a digital-in/digital-out card 44 attached to SLOT 4, the surround channel of the left front speaker L is patched to channel CH1, the surround channel of the right front speaker R patched to channel CH2, the surround channel of the left rear speaker Ls patched to channel CH3, the surround channel of the right rear speaker Rs patched to channel CH4, and no surround channel patched to channels CH5 to CH8. In this way, surround monitoring output of the (2+2)-channel surround mode can be monitored via the surround speakers arranged in the same manner as in the 5.1-channel surround mode. However, depending on the type of the original surround mode of external input signals, it may be impossible to appropriately deal with the external input signals by merely modifying the patching of the surround channels 104. In such a case, there may be provided a surround mode converter on a surround monitoring output path so as to convert the original surround mode of the external input signals to a surround mode that can be monitored by the system of the present invention. The surround mode converter may be implemented by any of the DSPs of the signal processing section 24.

Figures 8, 9:
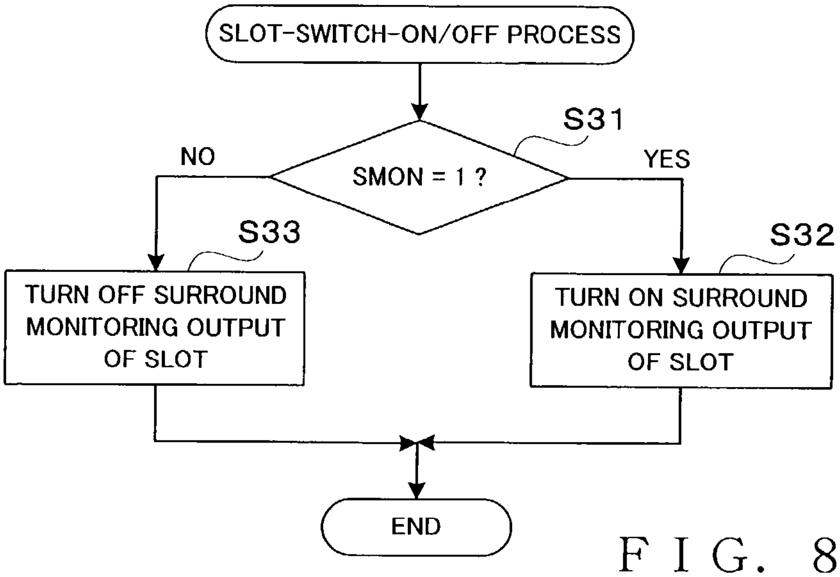
FIG. 8 is a flow chart of a slot-switch-on/off process performed in the digital mixer of FIG. 2.
FIG. 9 is a diagram showing allocation, to surround channels, of MIX buses in the digital mixer of FIG. 2.

When the MIX bus selecting button 71*a* has been activated, the MIX bus unit 47 outputs multi-channel surround signals as the surround monitoring output, as noted above. In this case, no surround monitor patch is set for the following reason. In the instant embodiment, the eight buses of the MIX bus unit 47 are fixedly allocated to the surround channels in a manner as illustrated in FIG. 9. Namely, when the 5.1-channel surround mode is set, BUS 1 of the MIX bus unit 47 is allocated to the left front speaker channel L, BUS 2 allocated to the right front speaker channel R, BUS 3 allocated to the left rear speaker channel Ls, BUS 4 allocated to the right rear speaker channel Rs, BUS 5 allocated to the center front speaker channel C, and BUS 6 allocated to the woofer speaker channel LFE. Such fixed allocation of the MIX buses corresponds to the allocation, to the channels of the above-mentioned eight-channel analog output unit 55, of the speaker channels of the 5.1-channel configuration. Thus, in the case where the MIX bus unit 47 outputs multi-channel surround signals as the surround monitoring output, it is only necessary that the output patch section 54 patch BUS1 to BUS 6 of the MIX bus unit 47 to CHANNEL 1 to CHANNEL 6 of the analog output unit 55. Where the surround mode of the MIX bus unit 47 is set in another mode than the 5.1-channel mode, it will suffice for the user to change, as necessary, the surround speakers to be connected to the analog output unit 55, so as to agree with the surround channel configuration of the MIX bus unit 47 in the other surround mode. For example, although the (2+2)-channel surround mode can be implemented by the speaker system corresponding to the channel configuration of the 5.1-channel surround mode, the speaker system had better be modified when the (3+1)-channel surround mode is to be implemented. As another example, there may be provided a surround mode converter, similar to the above-mentioned, for surround monitoring of the MIX bus unit 27.

Figure 7A:
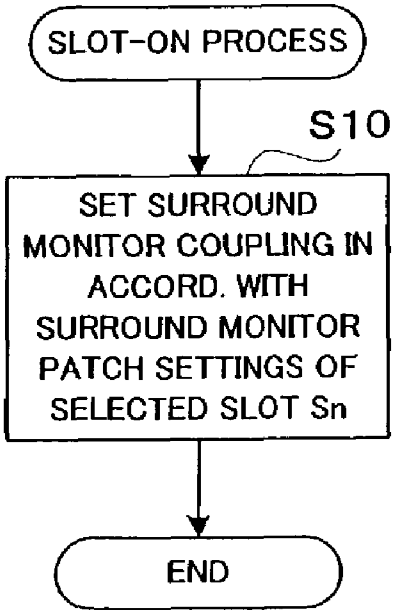
FIG. 7A is a flow chart of a slot-on process for setting a to-be-monitored nth slot in the surround monitor setting processing.

FIG. 7A is a flow chart of a slot-on process for setting a to-be-monitored slot in the above-described first surround monitor setting processing.

Once any one of the slot numbers 92 (SLOTn) displayed in the area 90 of Surround Monitor Setting Screen 1 of FIG. 5 is selected or turned on, the slot-on process is started, where at step S10, surround monitor coupling between the selected slot Sn (SLOTn) and the analog input unit 55 is set by the output patch section 54 in accordance with surround monitor patch settings of the selected slot Sn having been made in the second surround monitor setting processing described above in relation to FIG. 6.

Figure 7B:
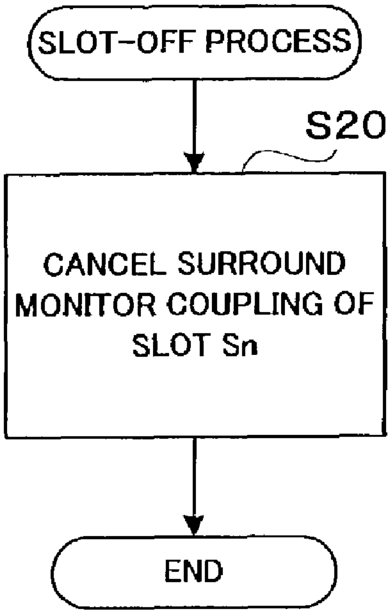
FIG. 7B is a flow chart of a slot-off process for canceling the settings of the to-be-monitored nth slot in the surround monitor setting processing.

FIG. 7B is a flow chart of a slot-off process for canceling the settings of the to-be-monitored slot in the above-described first surround monitor setting processing.

Once any one of the slot numbers 92 (SLOTn) displayed in the area 90 of Surround Monitor Setting Screen 1 of FIG. 5 is turned off, the slot-off process is started, where at step S20, the surround monitor coupling between the selected slot Sn (SLOTn) and the analog input unit 55 is canceled.

Further, FIG. 8 is a flow chart of a slot-switch-on/off process performed in response to turning on/off of the slot selecting button 71*b* in the surround monitoring switch group 71.

Once the slot selecting button 71*b* is activated or turned on in the surround monitoring switch group 71, the slot-switch-on/off process is started up. At step S31 of the slot-switch-on/off process, it is determined whether a surround monitor flag SMON is currently set at a value "1" or not. In this case, the surround monitor flag SMON is "1" since the slot selecting button 71*b* has been turned on; note that when the slot selecting button 71*b* is OFF, the surround monitor flag SMON is "0". When the MIX bus selecting button 71*a* and slot selecting button 71*b* are both OFF, user's operation of the MIX bus selecting button 71*a* can turn on the button 71*a*. Similarly, when the MIX bus selecting button 71*a*and slot selecting button 71*b* are both OFF, user's operation of the slot selecting button 71*b* can turn on the button 71*b*. Further, when the MIX bus selecting button 71*a* is ON and the slot selecting button 71*b* is OFF, user's operation of the MIX bus selecting button 71*a* can turn off the button 71*a* and turn on the button 71*b*. Furthermore, when the MIX bus selecting button 71*a* is OFF and the slot selecting button 71*b* is ON, user's operation of the MIX bus selecting button 71*a* can turn on the button 71*a*and turn off the button 71*b*, and user's operation of the slot selecting button 71*b* can turn off the button 71*b*. Once the slot selecting button 71*b* has been turned on and thus the surround monitor flag SMON has been set to "1", the process proceeds to step S32, where the output of the slot having been set as the surround monitoring output is turned on. In this way, externally-input multi-channel surround signals, i.e. initial mixing materials, can be monitored. If it is determined at step S31 that the surround monitor flag SMON is not at the value "1" (i.e. has been set to the value "0"), the process proceeds to step S33, where the slot having been set as the surround monitoring output is turned off. In this case, if the MIX bus selecting button 71*a* is ON, multi-channel surround signals mixed by the MIX bus unit 47 are provided as surround monitoring output, so that the multi-channel surround signals mixed by the MIX bus unit 47 can be monitored.

Whereas the embodiment of the digital mixer 1 has been described as having only one slot selecting button 71*b* for selecting a to-be-monitored slot, the digital mixer 1 of the present invention may have a plurality of such slot selecting buttons 71*b*. In such a case, a plurality of the SLOT buttons 91 and a plurality of the slot numbers 92 may be displayed in the area 90 of Surround Monitor Setting Screen 1 of FIG. 5 may be provided in corresponding relation to the slot selecting buttons 71*b*. Further, in this case, the plurality of slot selecting buttons 71*b* may be constructed to be turned on simultaneously so that two or more slots turned on via any of the slot selecting buttons 71*b* can be monitored simultaneously. Further, the embodiment of the digital mixer has been described as patching the individual channels of the card 44 to the surround channels via Surround Monitor Setting Screen 2 of FIG. 6. Alternatively, the individual channels of the card 44 may be patched directly to the channels of the analog output unit 55.

Furthermore, whereas the embodiment of the digital mixer 1 has been described above as setting the surround monitor patch for each of the slots, the surround monitor patch need not necessarily be set for each of the slots. For example, a plurality of input signals supplied to the input patch section may be divided into a plurality of groups so that the surround monitor patch is set for each of the groups. Moreover, the embodiment of the digital mixer 1 shown in FIG. 1 has been described as including the stereo monitoring speakers 11 and surround monitoring speaker unit 13 provided separately from each other, the left front speaker L and right front speaker R of the surround monitoring speaker unit 13 may also be used as the stereo monitoring speakers 11 so that the stereo monitoring speakers 11 can be dispensed with.

In summary, the present invention having been described so far is characterized by including output channels for outputting multi-channel surround signals as surround monitoring output. With such an arrangement, the present invention permits monitoring of both externally-input multi-channel surround signals (i.e., initial mixing materials) and recording multi-channel surround signals to be output by the mixing buses. In case the surround mode of the multi-channel surround signals to be supplied to the speakers does not agree with a particular surround mode of the speakers, the present invention can convert the surround mode of the multi-channel surround signals to correspond to the particular surround mode.

The present invention relates to the subject matter of Japanese Patent Application No. 2001-325970 filed on Oct. 24, 2001, the disclosure of which is expressly incorporated herein by reference in its entirety.

What is claimed is:

1. A digital mixer which selectively delivers a plurality of externally-input signals to plural buses of a mixing bus section to perform mixing on the input signals by each of the buses of said mixing bus section and selectively outputs mixed signals, said digital mixer inputting multi-channel surround signals as the externally-input signals, controlling levels of the externally-input signals, to be delivered to the mixing bus section, according to a surround channel configuration of said mixing bus section and localizing positions, and forming the mixed signals as multi-channel surround signals by said mixing bus section, wherein the surround channel configuration of said mixing bus section is more than four surround channels and the multi-channel surround signals formed by said mixing bus section have the same configuration as the surround channel configuration of said mixing bus section, said digital mixer comprising:

an output section having a plurality of monitoring output channels, the plurality of monitoring output channels corresponding to the surround channel configuration of said mixing bus section; and a selection section that is operable to select a monitoring option of converting a configuration of the multi-channel surround signals, which are input externally, in accordance with said surround channel configuration of said mixing bus section, supplying said output section with the multi- channel surround signals having been input externally and having the converted configuration, and thereby realizing monitoring of the multi-channel surround signals, which have been input externally, via said output section, without passing through the mixing bus section, wherein said selection section is also operable to also select another monitoring option of supplying said output section with the multi-channel surround signals formed by said mixing bus section and thereby realizing monitoring of the formed multi-channel surround signals via said output section.

2. A digital mixer as claimed in claim 1 which further comprises a monitoring speaker system provided in corresponding relation to the plurality of monitoring output channels for monitoring of multi-channel surround signals.

3. A digital mixer as claimed in claim 1 wherein said selection section includes a button operable to select the monitoring option of monitoring the externally-input multi-channel surround signals which have not passed through the mixing bus section.

4. A digital mixer as claimed in claim 1 wherein said selection section is operable to select, in an alternative way, the monitoring option of monitoring the externally-input multi-channel surround signals which have not passed through the mixing bus section and the monitoring option of monitoring the multi-channel surround signals formed by said mixing bus section.

5. A digital mixer as claimed in claim 1 wherein the plurality of externally-input signals are divided into a plurality of groups and at least one of the groups comprises multi-channel surround signals, and wherein said selection section selects one or more groups from among the plurality of groups and converts the configuration of the multi-channel surround signals of the selected one or more groups to the surround channel configuration of said mixing bus section.

6. A digital mixer as claimed in claim 1 which further comprises a speaker system corresponding to a particular surround channel configuration that corresponds to a particular multi-channel surround mode, and wherein said plurality of monitoring output channels of said output section correspond to the particular surround channel configuration of said speaker system, and wherein when said surround channel configuration of the externally-input multi-channel surround signals does not agree with the particular surround channel configuration, said selection section converts the surround channel configuration of the externally-input multi-channel surround signals so as to correspond to the particular surround channel configuration.

7. A digital mixer which selectively delivers a plurality of externally-input signals grouped into a plurality of groups to each of plural buses of a mixing bus section, mixes the input signals delivered to the bus, and selectively passes mixing signals formed by the buses of the mixing bus section to a plurality of outputs, said digital mixer comprising:

a surround mode designation section that designates a surround mode to be implemented by said mixing bus section, wherein a channel configuration corresponding to the designated surround mode is more than four surround channels;

an input channel section that controls volume levels of the plurality of externally-input signals in correspondence with the surround mode designated by said surround mode designation section and localizing positions, and selectively delivers the plurality of externally-input signals, having been controlled the volume thereof, to said mixing bus section, wherein each of said plural buses of said mixing bus section mixes the plurality of externally-input signals delivered thereto and multi-channel surround signals are formed by said mixing bus section;

a monitoring surround speaker system corresponding to a channel configuration of the designated surround mode;

a first monitor control section that supplies said monitoring surround speaker system with the multi-channel surround signals that are obtained by said mixing bus section and have the channel configuration corresponding to the designated surround mode;

an indication section that, for each of the plurality of groups, indicates a surround channel configuration of the plurality of input signals when the plurality of input signals are surround signals; and a second monitor control section that selects at least one of the plurality of groups, converts the externally-input signals of the selected group, having the surround channel configuration indicated for the selected group by said indication section, into multi-channel surround signals having the channel configuration of the designated surround mode and supplies said monitoring surround speaker system with the converted surround signals.

8. A method for monitoring surround signals in a digital mixer which selectively delivers a plurality of externally-input signals to each of plural buses of a mixing bus section, mixes the input signals delivered to the bus, and selectively outputs mixing signals formed by said buses of said mixing bus section, said digital mixer inputting multi-channel surround signals as the externally-input signals, controlling levels of the externally-input signals, to be delivered to the mixing bus section, according to a surround channel configuration of said mixing bus section and localizing positions, and forming the mixing signals as multi-channel surround signals by said mixing bus section, said digital mixer including a plurality of monitoring output channels corresponding to the surround channel configuration of said mixing bus section, wherein the surround channel configuration of said mixing bus section is more than four surround channels and the multi-channel surround signals formed by said mixing bus section have the same configuration as the surround channel configuration of said mixing bus section, said method comprising:

a step of selecting one of first and second monitoring options;

a step of, when the first monitoring option is selected, converting a configuration of the multi-channel surround signals, which are input externally, in accordance with said surround channel configuration of said mixing bus section, supplying said monitoring output channels with the multi-channel surround signals having been input externally and having the converted configuration, and thereby realizing monitoring of the multi-channel surround signals, which have been input externally, via said monitoring output channels, without passing through the mixing bus section; and a step of, when the second monitoring option is selected, supplying said monitoring output channels with the multi-channel surround signals formed by said mixing bus section and thereby realizing monitoring of the formed multi-channel surround signals via said monitoring output channels.

9. A computer program, embodied on a computer-readable medium, containing a group of instructions to cause a computer for a digital mixer to perform a procedure for monitoring surround signals in said mixer which selectively delivers a plurality of externally-input signals to each of plural buses of a mixing bus section, mixes the input signals delivered to the bus, and selectively outputs mixing signals formed by said buses of said mixing bus section, said digital mixer inputting multi-channel surround signals as the externally-input signals, controlling levels of the externally-input signals, to be delivered to the mixing bus section, according to a surround channel configuration of said mixing bus section and localizing positions, and forming the mixing signals as multi-channel surround signals by said mixing bus section, said digital mixer including a plurality of monitoring output channels corresponding to the surround channel configuration of said mixing bus section, wherein the surround channel configuration of said mixing bus section is more than four surround channels and the multi-channel surround signals formed by said mixing bus section have the same configuration as the surround channel configuration of said mixing bus section, said procedure comprising:

a step of selecting one of first and second monitoring options;

a step of, when the first monitoring option is selected, converting a configuration of the multi-channel surround signals, which are input externally, in accordance with said surround channel configuration of said mixing bus section, supplying said monitoring output channels with the multi-channel surround signals having been input externally and having the converted configuration, and thereby realizing monitoring of the multi-channel surround signals, which have been input externally, via said monitoring output channels, without passing through the mixing bus section; and a step of, when the second monitoring option is selected, supplying said monitoring output channels with the multi-channel surround signals formed by said mixing bus section and thereby realizing monitoring of the formed multi-channel surround signals via said monitoring output channels.

10. A digital mixer as claimed in claim 1 which is operable to input plural sets of the multi-channel surround signals, each of which has a configuration different from each other, and wherein said selection section is operable to select the monitoring option for each of the sets of the multi-channel surround signals.

* * * * *